Patented Sept. 5, 1939

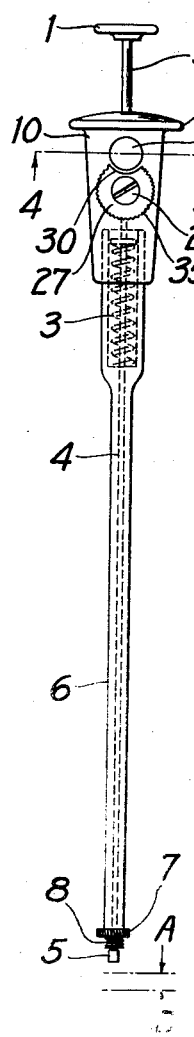

2,172,294

UNITED STATES PATENT OFFICE 2,172,294

RATCHET CABLE RELEASE

William A. Riddell, Rochester, N. Y., assignor to Eastman Kodak Company, Rochester, N. Y., a corporation of New Jersey Application February 9, 1938, Serial No. 189,601

7 Claims. (Cl. 74—502)

This invention relates to photography, and more particularly to cable releases for photographic shutters.

One object of my invention is to provide a cable release which can be used for making time exposures with shutters which are not equipped with means for making time exposures built in the shutter. Another object of my invention is to provide a cable release having a pair of compressible finger grips which may be positively held together after a plunger has been depressed. Still another object of my invention is to provide a cable release in which the latch may positively hold the plunger in different positions according to the amount of depression required for the particular shutter on which the cable release is used. Still another object of my invention is to provide a cable release with a latch for holding the shutter open and to provide a supplementary push-button for releasing the release. A still further object of my invention is to provide a pawl and ratchet latching arrangement between the finger grips of a cable release and to provide a means for normally holding the latch elements out of engagement so that the cable release may be used in the usual manner for making instantaneous exposures, when desired. Other objects will appear from the following specification, the novel features being particularly pointed out in the claims at the end thereof.

This cable release is of the same general type as the cable release shown in my copending application Serial No. 178,769, filed December 8, 1937. In this application a means for holding the cable release plunger in a depressed position was purely a friction means. The present application substitutes for the friction latch a positive latch which is desirable for certain types of shutters and particularly desirable for shutters in which there is a rather powerful spring which normally returns the trigger or master member to its initial position.

Coming now to the drawing wherein like reference characters denote like parts throughout:

Fig. 1 is a side elevation of a typical cable release constructed in accordance with and embodying a preferred form of my invention.

Fig. 2 is an enlarged sectional view taken through the finger grips of the cable release shown in Fig. 1, parts being shown in elevation.

Fig. 3 is an enlarged fragmentary detail showing the parts in a different position from that of Fig. 2.

Fig. 4 is an enlarged fragmentary section taken on line 4—4 of Fig. 1.

In accordance with the preferred embodiment of my invention shown in the drawing, the cable release may consist of a pair of finger grips 1 and 2 which are normally spaced apart by means of a spring 3, but which may be moved toward each other to actuate a thrust member 4 which has a ferrule 5 on its end for actuating a photographic shutter.

The thrust member 4 extends inside a tubular member 6 which has a suitable ferrule 7 for attaching the cable release to a shutter by means of the thread 8. The finger grip 1 is directly attached to a plunger 9 which, in turn, is connected to the thrust member 4, as best shown in Fig. 2. As thus far described, the cable release is of a well known type.

However, it is desirable to have a cable release in which the finger grips 1 and 2 may be held toward each other so that a shutter may be held open as long as the finger grips are held together and so that the shutter may close when the finger grips are permitted to return to their normal position. In order to accomplish this, I have provided one of the finger grips 2 with a base portion 10 which is made hollow to receive the different parts of the release. There is an opening 11 extending directly through the finger grip 2, this opening having a threaded portion 12 to receive a threaded end of a cylindrical member 13 in which the spring 3 is normally located. There is a second cylindrical opening 14 which encloses the end of the fabric 15 extending around the outside of a coiled spring 17 which supports the casing member.

The finger grip 2 is also provided with a transverse aperture 18 in which a plug 19 is slidably mounted, this plug being normally thrust by a spring 20 so that a pawl 21 may be brought into engagement with a ratchet tooth 22.

The pawl in this construction is rather unusual but can be simply and inexpensively made. The plug 19 is drilled out at 23 to provide a cylindrical aperture of considerably larger diameter than the diameter of the thrust member 9 and at the lower end of the aperture 23 the walls of the aperture are tapered inwardly at 24. Thus, there remains a relatively sharp edge 21 which is annular in shape and which forms a pawl member to engage the annular ratchet teeth 22 cut on the thrust member 9. This construction is desirable because the thrust member 9 may turn in operation relative to the finger grip 2 and it is immaterial what radial position the thrust member may have because the pawl 21 will always contact with one of the teeth.

On the outer end of the plug 19 there is a groove 25 which is adapted to receive an edge 26 of a disk 27 mounted to turn upon the headed stud 28.

When the disk is turned so that a portion of the disk lies in the slot 25, as indicated in Fig. 3, it will be noted that the pawl 21 is so positioned that it will not contact with any of the ratchet teeth 22 and the plunger 9 will be directly centered in the aperture 23. When in this position, the plunger may slide back and forth freely and the cable release may be used to make the usual instantaneous exposures by depressing the finger grip 1 toward the finger grip 2 and by permitting the spring 3 to return the finger grip 1 as soon as released by an operator.

Where it is desirable to make a prolonged exposure with shutters which only have the so-called "bulb" exposure settings—that is, with shutters in which the trigger is depressed to open the shutter and released to close the shutter—the disk 27 may be turned so that an arcuate notch 30 in the disk 27 may lie opposite the rounded end 31 of the plug which forms a press button and so that the plug may assume the position shown in Fig. 2 with the pawl 21 in proper position to engage one of the teeth of the ratchet 22. When in this position, if the finger grips are pressed toward each other, the plunger 9 passes downwardly through the aperture 11 and the pawl 21 will hold the plunger in its depressed position.

It might be pointed out here that different shutters require a different degree of movement of the operating ferrule 5. For instance, one shutter may require this ferrule to be pushed downwardly to the position indicated by the dashed line A, and a second shutter may require the ferrule to be depressed to the line indicated at B. It is therefore desirable to have the plunger become latched at whatever downward position may be required for the particular shutter in use. This is the reason why I have provided a series of ratchet teeth axially of the plunger 9 so that whatever the thrust required, the pawl 21 will always have the opportunity to engage a tooth 22 and ratchet the plunger in its depressed position.

By allowing the finger grip to remain depressed for the required length of time, the shutter may be closed by merely pressing in on the push-button 31. This causes the pawl 21 to release a tooth 22. Moreover, when the push-button is depressed, the shoulder 33 of the plug will engage the shoulder 34 of the finger grip 2 and cause the inward movement of the plug to stop when the parts are in the position shown in Fig. 3, in which the plunger is free of the pawl 21 and may slide freely through the aperture 21.

If the release is to be used a second time for time exposures, the finger grip 31 may be released. If, however, it is desirable to return the release to its instantaneous operating position, it is only necessary to turn the disk 27 which is knurled around its edge 35 so that a portion of the disk lies in the slot 25 of the plug and thus prevents its return movement from the position shown in Fig. 3.

I claim:

1. In a cable release, the combination with a pair of finger grips, a tubular member carried by one finger grip, a plunger carried by the other finger grip, a plurality of ratchet teeth formed on the plunger, a pawl inside of the tubular finger grip mounted to move between two positions in one of which said pawl may engage said ratchet and hold said plunger in a set position and in the other of which said pawl is retained out of engagement with said plunger permitting said plunger to move idly in the finger grip, and means for retaining said pawl in a set position.

2. In a cable release, the combination with a pair of finger grips, a hollow member carried by one finger grip, a plunger carried by the other finger grip and extending into the hollow member carried by the first-mentioned finger grip, a spring for normally separating the finger grips, a pawl and ratchet, one carried by the plunger finger grip and the other by the hollow finger grip, said parts being adapted to contact to hold the plunger finger grip in a depressed condition, and means on the exterior of a finger grip for holding the pawl out of engagement with the ratchet.

3. In a cable release, the combination with a pair of finger grips, a hollow member carried by one finger grip, a plunger carried by the other finger grip and extending into the hollow member carried by the first-mentioned finger grip, a spring for normally separating the finger grips, a pawl and ratchet forming cooperating parts, one part being carried by the plunger finger grip and the other part by the hollow finger grip, said parts being adapted to contact to hold the plunger finger grip in a depressed condition, said ratchet comprising a plurality of teeth cut in the plunger, and said pawl comprising a movably mounted toothed member adapted to engage the ratchet, and means carried on the exterior of a finger grip for positioning the pawl out of engagement with the ratchet.

4. In a cable release, the combination with a pair of finger grips, a hollow member carried by one finger grip, a plunger carried by the other finger grip extending into the hollow member carried by the first-mentioned finger grip, a spring for normally separating the finger grips, a pawl and ratchet forming cooperating parts, one part being carried by the plunger finger grip and the other part being carried by the hollow finger grip, said parts being adapted to contact to hold the plunger finger grip in a depressed condition, said ratchet comprising a plurality of teeth cut in the plunger, and said pawl comprising a movably mounted toothed member adapted to engage the ratchet, and means carried on the exterior of a finger grip for positioning the pawl out of engagement with the ratchet, said means comprising a movable member adapted to move to and from a position for engaging the pawl, and an end on the pawl for releasing it manually from said ratchet.

5. In a cable release, the combination with a pair of finger grips, a tubular member carried by one finger grip, a plunger carried by the other finger grip, a plurality of ratchet teeth formed on the plunger, a pawl inside of the tubular finger grip comprising a movable member including an aperture with an inwardly projecting face constituting a pawl adapted to engage the ratchet teeth in the plunger passing through the aperture of the movable member, means for moving the pawl to release the ratchet including a plunger integral with the pawl and extending through said hollow finger grip to form an operating button for said pawl.

6. In a cable release, the combination with a pair of finger grips, a tubular member carried by one finger grip, a plunger carried by the other finger grip, a plurality of ratchet teeth formed on the plunger, a pawl inside of the tubular finger grip comprising a movable member having an aperture therethrough with an inwardly projecting face constituting a pawl adapted to engage the ratchet teeth on the plunger passing through the tubular member, means for moving the pawl to release the ratchet including a release button extending through said hollow finger grip and forming an integral part of said pawl, and means also on the outside of the finger grip for moving the pawl to a position in which the ratchet may slide idly therethrough.

7. In a cable release, the combination with a pair of finger grips, a tubular member carried by one finger grip, a plunger carried by the other finger grip, a plurality of ratchet teeth formed on the plunger, a pawl inside of the tubular finger grip in the form of a slidable member having an aperture therethrough of an inside diameter sufficient to permit the ratchet to slide axially therethrough, and having a tooth-like wall forming the ratchet engaging portion of the pawl, said slidable member being movable transversely of the hollow grip, a spring tending to move said member until said tooth-like pawl may engage said ratchet and hold said plunger in a set position, and a button carried by the end of said pawl and outside of said hollow finger grip for moving the slidable member against spring pressure to release the pawl and ratchet.

WILLIAM A. RIDDELL.